May 20, 1924.
J. M. SELLERS
APPARATUS FOR BALLING SCRAP METAL
Filed April 27, 1922     6 Sheets-Sheet 3
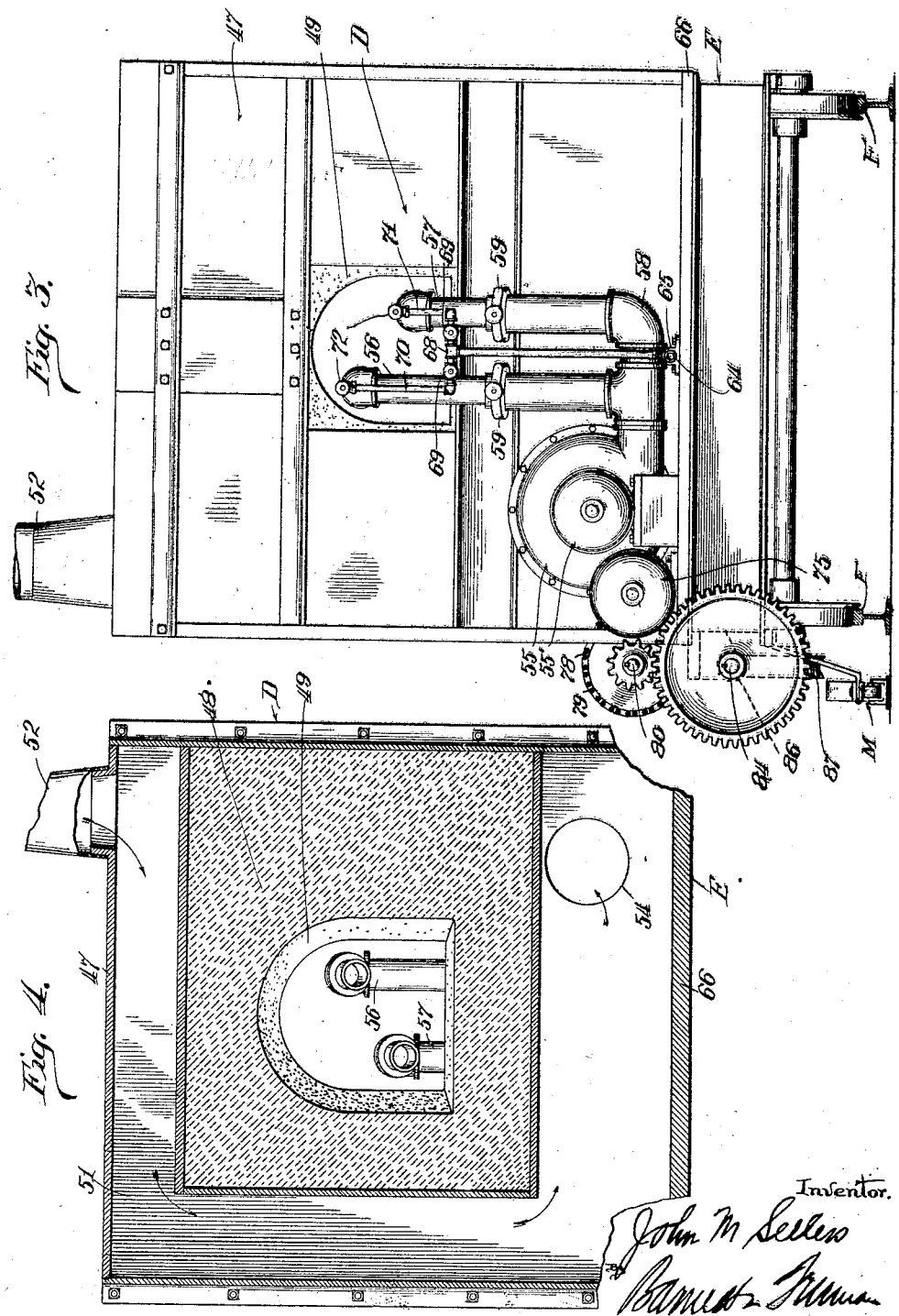

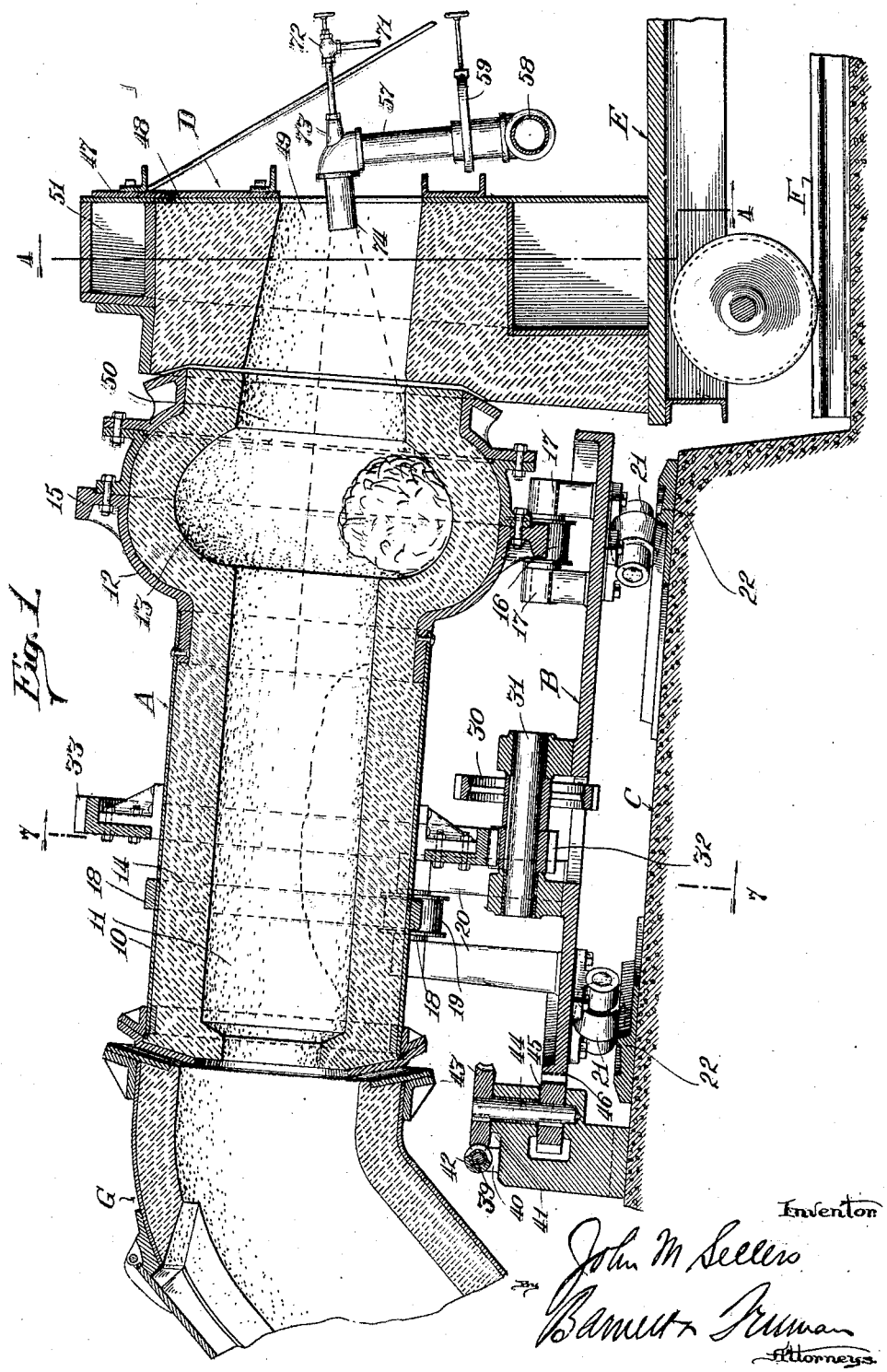

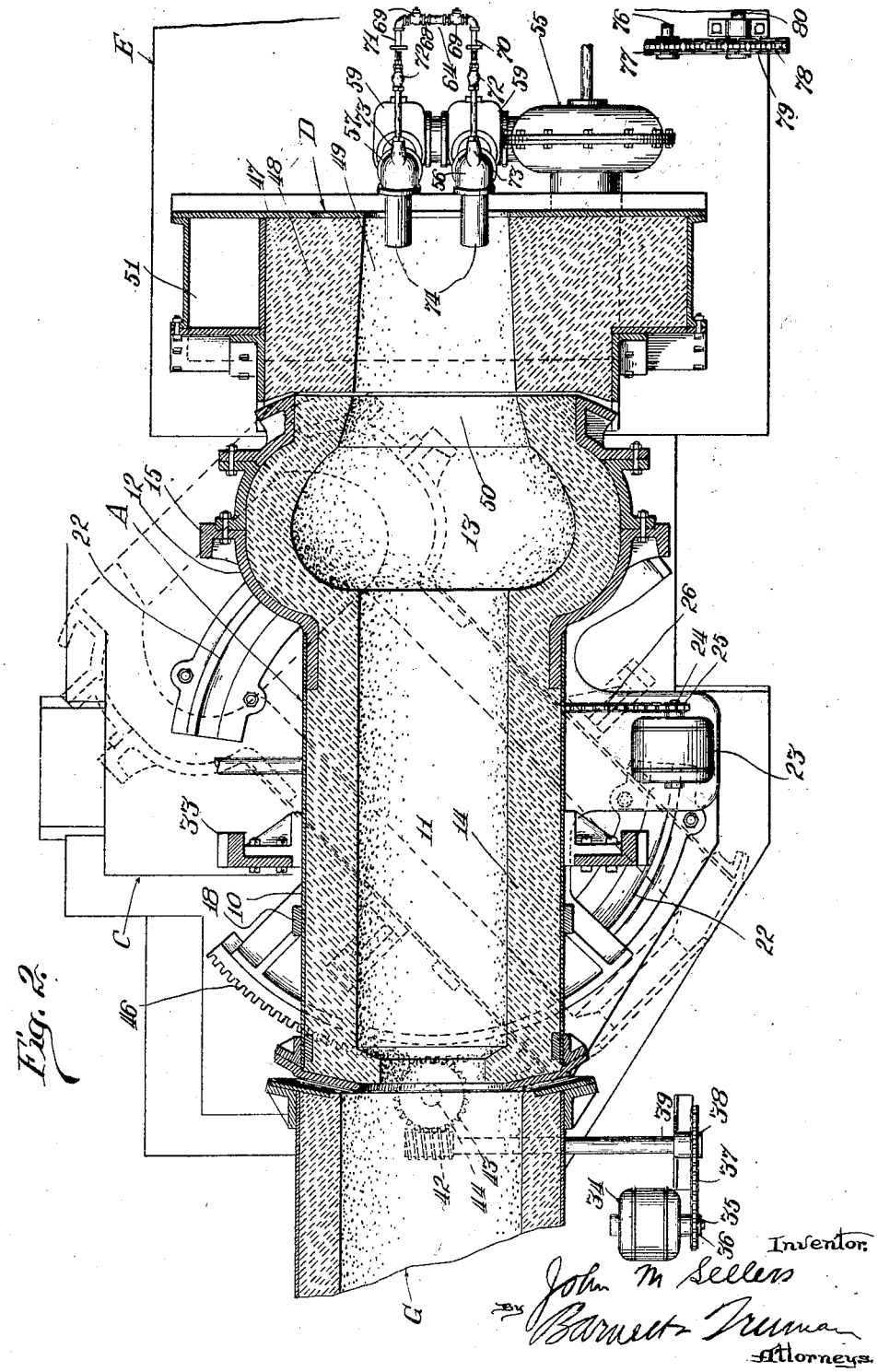

May 20, 1924.
J. M. SELLERS
APPARATUS FOR BALLING SCRAP METAL
Filed April 27, 1922    6 Sheets-Sheet 4
1,494,635
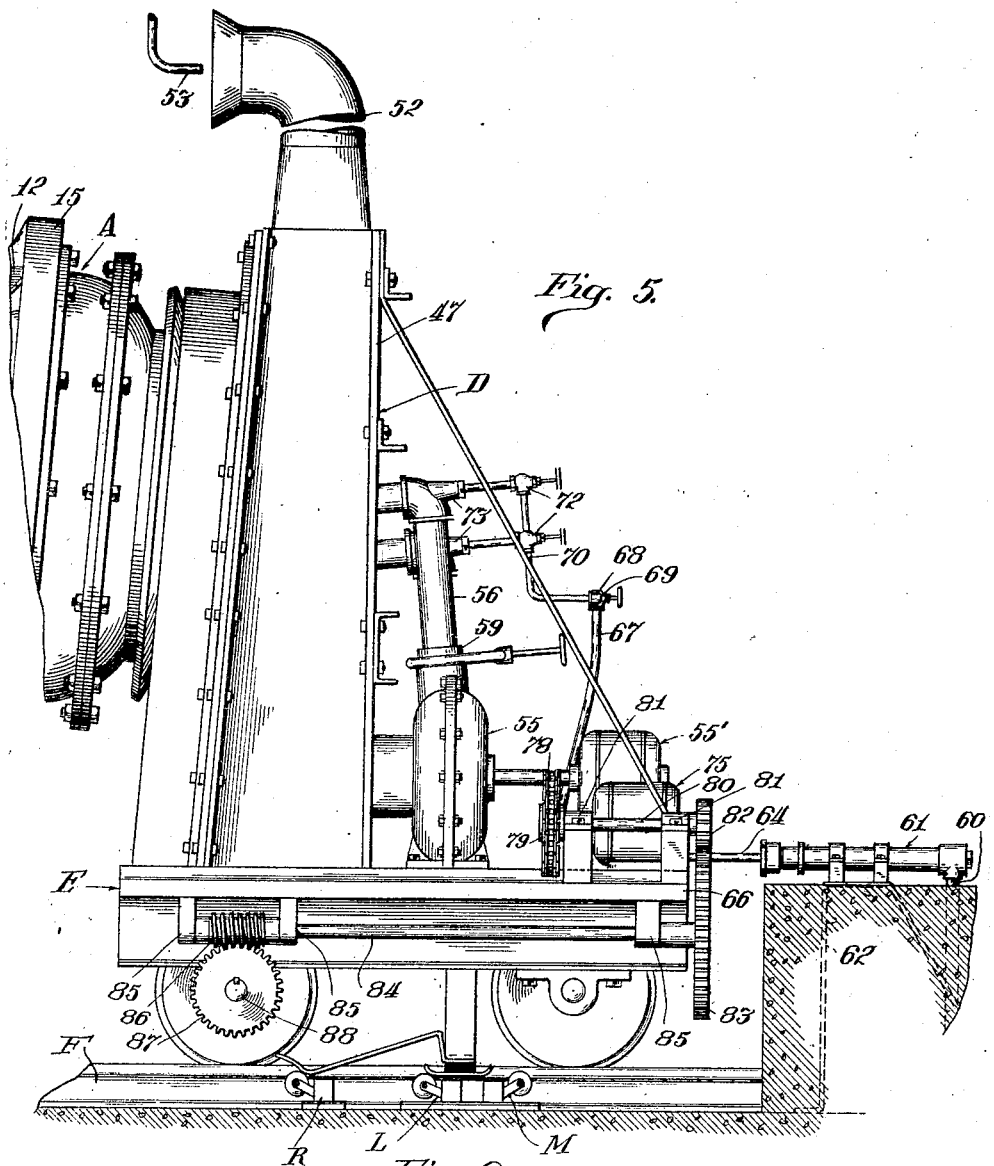
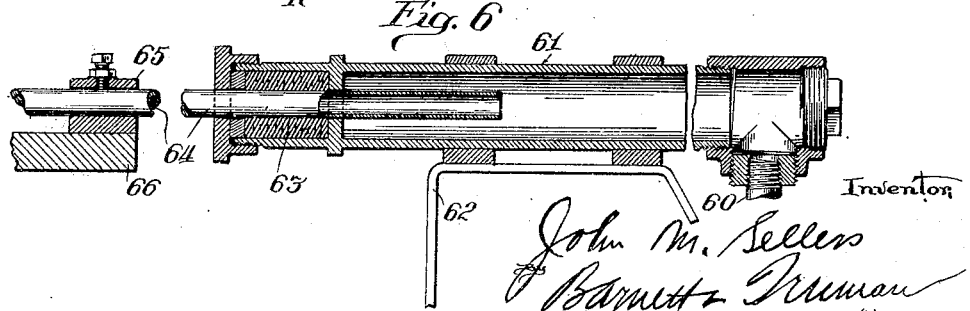

May 20, 1924.  1,494,635
J. M. SELLERS
APPARATUS FOR BALLING SCRAP METAL
Filed April 27, 1922   6 Sheets-Sheet 5
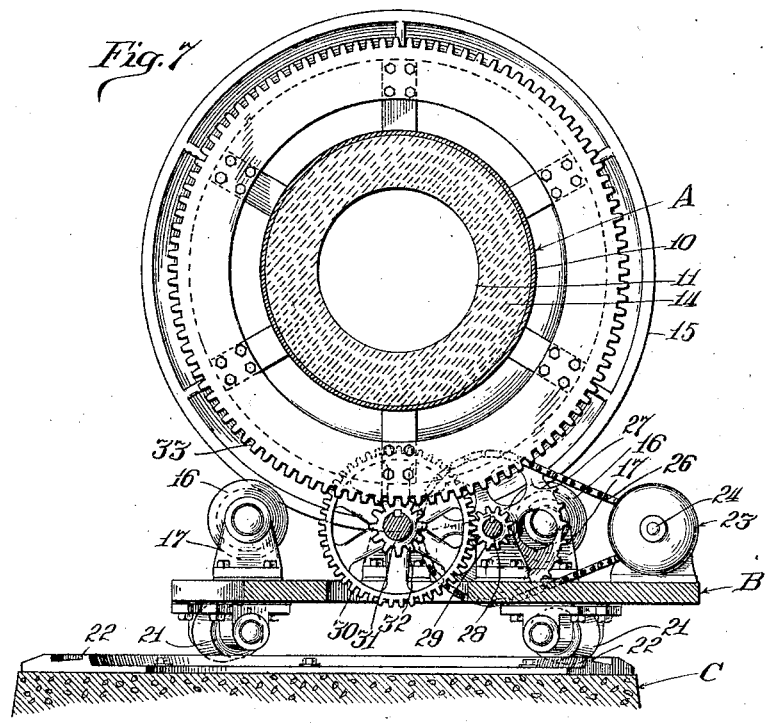
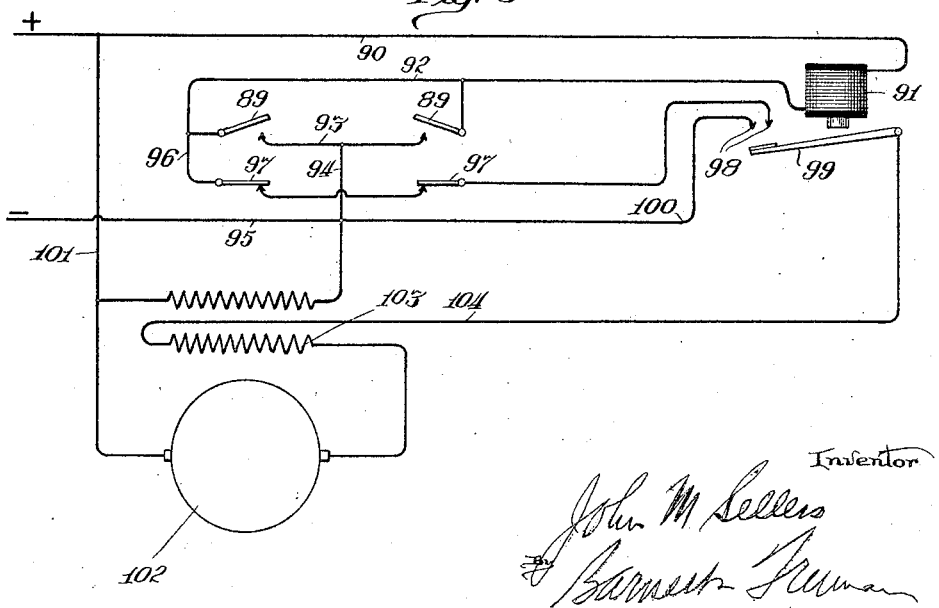

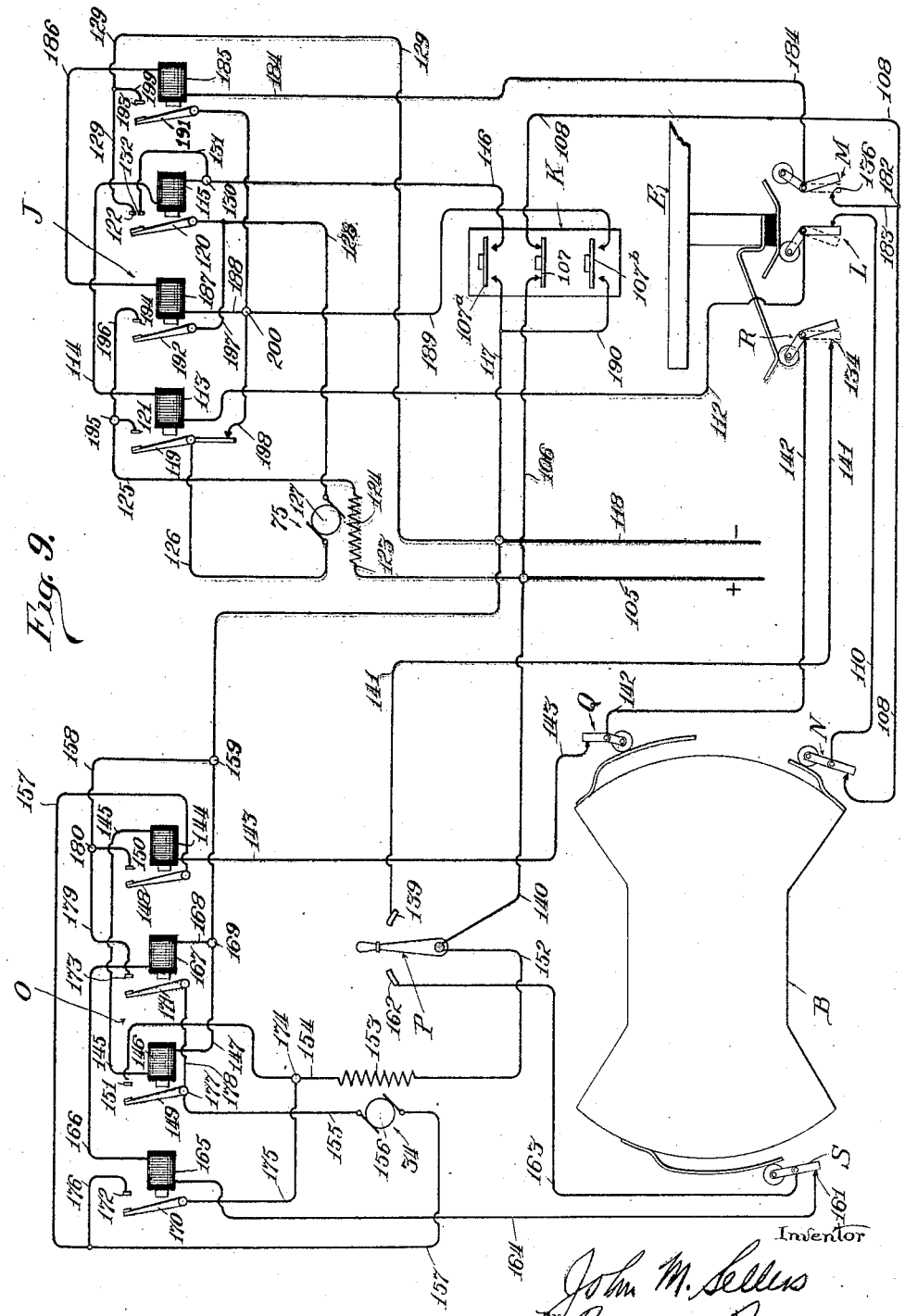
May 20, 1924.
J. M. SELLERS
APPARATUS FOR BALLING SCRAP METAL
Filed April 27, 1922
1,494,635
6 Sheets-Sheet 6

Patented May 20, 1924.

1,494,635

UNITED STATES PATENT OFFICE.

JOHN M. SELLERS, OF DOWNERS GROVE, ILLINOIS, ASSIGNOR TO SELLERS MANUFACTURING COMPANY, OF CHICAGO, ILLINOIS, A CORPORATION OF ILLINOIS.

APPARATUS FOR BALLING SCRAP METAL.

Application filed April 27, 1922. Serial No. 556,891.

*To all whom it may concern:*

Be it known that I, JOHN M. SELLERS, a citizen of the United States, residing at Downers Grove, in the county of Du Page and State of Illinois, have invented certain new and useful Improvements in Apparatus for Balling Scrap Metal, of which the following is a specification.

My invention relates to balling scrap as a step in the manufacture of wrought iron from scrap iron and steel, and one of the principal objects of the invention is to provide certain improvements in the balling apparatus disclosed in United States patent to D. H. Lentz No. 1,012,872 patented December 26, 1911 for apparatus for balling scrap metal. A further related object is to provide suitable apparatus for carrying out the improved balling process disclosed in my co-pending application Serial No. 549,310 filed April 3, 1922.

The type of apparatus with which this invention is primarily concerned, that is to say, the type of apparatus exemplified in the Lentz patent just referred to, comprises a rotary balling furnace having a substantially cylindrical preheating chamber in which the charge of scrap is placed and an annular balling chamber of larger diameter at one end of the furnace, the furnace being arranged between spaced inlet and outlet flues in alignment therewith but capable of being turned, on a substantially vertical axis, out of alignment with said flues in order that the finished balls may be removed and the furnace re-charged. In the patented apparatus both flue sections are stationary so that in practice it is necessary to space the flues at some little distance from the ends of the furnace, when the furnace is aligned therewith, in order to give room for the turning movements of the furnace. This is objectionable so far as the inlet flue is concerned, because it makes possible the escape from the furnace of a considerable volume of flame. Furthermore, in the Lentz apparatus the furnace was heated by the products of combustion of a coal fire and I have discovered that a better grade of iron and other improved results can be obtained by the use of a fluid fuel, such as petroleum oil, when properly introduced with superheated air and burned in or near the balling chamber. My present invention contemplates making the inlet flue movable to and from the furnace so that the space intervening between the flue and the balling chamber is reduced to a minimum. The invention further provides new and improved means for introducing the fluid fuel and superheated air into the furnace. The movements of the inlet flue carrying the fuel feeding apparatus and the movements of the turn-table on which the furnace is supported are preferably effected, in accordance with my present invention, by means of electric motors, and it is one of the objects of the invention to provide a control mechanism for said motors whereby these movements can take place only in their proper sequence. In this way a careless manipulation of the apparatus liable to injure or destroy it is prevented.

The invention consists in the novel and improved arrangements, constructions and devices, to be hereinafter described and claimed, for carrying out the above stated objects and such other incidental objects as will be mentioned in connection with the following description of the preferred embodiment of the invention shown in the accompanying drawings.

In the drawings,

Fig. 1 is a longitudinal vertical sectional view of the apparatus.

Fig. 2 is a longitudinal horizontal sectional view of the same showing in dotted lines the position to which the furnace is turned for removal of the ball and reception of a new charge of scrap.

Fig. 3 is a view, in elevation, of the front end of the apparatus.

Fig. 4 is a sectional view on line 4—4 of Fig. 1.

Fig. 5 is a side view, in elevation, of the front end of the apparatus.

Fig. 6 is a longitudinal sectional view of a portion of the oil feeding conduit.

Fig. 7 is a sectional view on line 7—7 of Fig. 1.

Fig. 8 is a wiring diagram to illustrate the control of the electric motor employed for rotating the furnace on its longitudinal axis, and Fig. 9 is a diagram of the control mechanism for governing the synchronized movements of the turn-table supporting the furnace and the carriage supporting the inlet flue.

Referring to the drawings, A designates the balling furnace which is supported on a turn-table B arranged on a base or flooring C which is slightly inclined from the horizontal. D is an inlet flue supported on a carriage E running on tracks F arranged below the level of the base C. G is the outlet flue connected with a stack (not shown).

The furnace A consists of a cylindrical shell 10, providing a pre-heating chamber 11, and of an annular shell 12, of larger diameter at one end of the cylindrical shell which provides a balling chamber 13. The preheating and balling chambers are lined with suitable fire brick 14.

The furnace is revolubly supported on two pairs of rollers. The forward end of the furnace, that is to say, the balling chamber end, is provided with a circular track 15 which bears upon a pair of grooved rollers 16 carried in standards 17 secured to turn-table B. Another circular track 18 is provided near the charging end of the furnace which bears on rollers 19 carried by standards 20 on the turn-table. The turn-table is provided with rollers 21 adapted to run over arcuate tracks 22 arranged on the inclined base C.

The furnace is rotated on its longitudinal axis by the following driving mechanism: 23 is an electric motor carried on the turn-table, the armature shaft 24 of which (Figs. 2 and 7) is provided with a sprocket 25 so as to drive, by chain 26, a sprocket wheel 27 of much larger diameter on the shaft 28 and on this shaft is a small gear 29 meshing with a large gear 30 on a shaft 31 (see also Fig. 1), the latter having thereon a small gear 32 meshing with a circular rack 33 on the shell 10 of the furnace.

The turn-table B is rotated to move the furnace into and out of alignment with the inlet and discharge flues by means of the following mechanism: 34 is an electric motor of the reversible type (preferably with compound wound field) its armature shaft 35 carrying a sprocket 36 which drives, by chain 37, a sprocket 38 of larger diameter on a shaft 39 journalled in bearings 40 on a support 41 arranged under the forward end of the discharge flue G (Figs. 1 and 2). Shaft 39 is provided with a worm 42 meshing with a worm wheel 43 on a short shaft 44 journaled in the support 41 and carrying at its lower end a gear wheel 45 adapted to mesh with a sector gear 46 at the rear edge of the turn table B.

The inlet flue comprises a metallic structure 47 lined with fire brick 48, the duct 49 therethrough aligning with the opening 50 into the balling chamber 13. The metallic structure is formed with an air heating duct 51 (Fig. 4) having an intake 52 arranged, preferably, directly above the space or crack between the inlet flue structure D and the furnace A so that the air received thereby is heated to a certain extent before it enters the duct. Preferably steam is injected into the air passing through duct 51 from a nozzle 53. The air is drawn from duct 51 through opening 54 by a fan 55 operated by motor 55′ (Figs. 3 and 4) and is injected mixed with fuel oil into the balling chamber through one or more nozzles. In the drawing I have shown two of these nozzles 56, 57, one being placed at a higher level than the other on account of the tendency of the ball to roll up the curved surface of the balling chamber due to rotation of the furnace. Nozzles 56, 57 are connected with the fan by a manifold 58. The flow of air through the nozzles is regulated by valves 59. 60 is an oil supply pipe (Figs. 5 and 6) extending into a casing 61 carried on a support 62 forwardly of the track F. This casing is provided with a stuffing box 63 into which projects a pipe 64 clamped to a block 65 on the platform 66 of carriage E. This pipe extends outwardly, as indicated at 67, to a manifold 68 provided with valves 69. Branch pipes 70, 71 provided with valves 72 extend into the air nozzles 56, 57 through stuffing boxes 73. The inner ends 74 of the nozzles are positioned so as to direct the jet of air and oil downwardly into the balling chamber 13. When the carriage E is moved back and forth on track F oil pipe 64 slides telescopically within the casing 61.

The mechanism for moving the carriage E to and from the furnace is as follows: 75 is an electric motor of the reversing type, the armature shaft 76 of which carries a sprocket 77 (Figs. 2 and 5) which drives, by belt 78, a sprocket wheel 79 (Fig. 3) on a shaft 80 journaled in bearings 81 on the platform 66 of the carriage. Shaft 80 carries a small gear 82 which meshes with a large gear 83 on a shaft 84 journaled in bearings 85 under the platform 66 of the carriage. Shaft 84 is provided with a worm 86 meshing with a worm gear 87 on one of the wheel axles 88 of the carriage.

The controlling mechanism for motor 23 which rotates the furnace is as follows (Fig. 8): Two or more starting buttons 89 are provided arranged in the following momentarily closed circuit: (No. 1) Wire 90, relay 91, wire 92, wire 93, wire 94 and wire 95. The energization of relay 91 closes a holding circuit as follows: (No. 2) From wire 92 through wire 96, stop switches 97, 97 which are normally closed, contacts 98, 98 which are closed by the switch arm 99 on the relay armature, and wire 100 to wire 95. The circuit through the motor is as follows: (No. 3) Wire 101, motor armature 102, series field 103, wire 104, switch arm 99 and wires 100 and 95. The motor is stopped by opening either of the stop switches 97 which are push buttons or other suitable circuit breaking devices. The breaking of the circuit at 97 deenergizes the relay causing it to drop its armature switch arm 99, thereby breaking the circuit through the motor.

Mechanisms for controlling motors 75 and 34 are shown diagrammatically in Fig. 9. The mechanism for controlling motor 75 comprises a relay J, a set of push buttons K and limit switches L, M and N (Figs. 5 and 9) arranged in circuits to be hereafter described. The limit switches L and M are automatically operated by the movement of the carriage E and the limit switch N is operated by the turn-table B. The mechanism for controlling the motor 34 comprises a relay O, a manually controlled switch P and automatically operated limit switches Q, R and S. The limit switches Q and S are operated by the movement of the turn-table B and the limit switch R by the flue supporting carriage E. The function of the above devices will be described in connection with the electric circuits Nos. 4 to 13 inclusive for energizing motors 75 and 34.

Circuit No. 4 is momentarily closed through certain magnets of the relay J and is as follows: Wires 105, 106, circuit breaker 107, wire 108, limit switch N, operated by the turn-table B, wire 110, limit switch L, operated by the carriage E on which the inlet flue is supported, wire 112, relay magnet 113, wire 114, relay magnet 115, wire 116, momentarily closed circuit maker 107ª and wires 117 and 118. The energization of the relay magnets 113, 115 moves their armatures 119, 120 against contacts 121 and 122, respectively, thereby closing a circuit (No. 5) through the motor 75 as follows: Wire 123, series field 124 of the motor, wire 125, contact 121, relay armature 119, wire 126, armature 127 of motor 75, wire 128, relay armature 120, contact 122 and wires 129 and 118. The motor circuit is held closed by means of a holding circuit (No. 6), consisting of circuit No. 4 to binding post 130; thence through wire 131, contact 132, relay armature 120, contact 122 and wires 129 and 118. When the flue supporting carriage E moves a predetermined distance away from the furnace A, the limit switch L is automatically opened and thereby opens the holding circuit No. 6, whereupon the armatures 119, 120 move away from the contacts 121 and 122, so as to break the circuit through the motor 75. When the carriage reaches said predetermined position, limit switches R and M, operated by the carriage E, are moved against contacts 134 and 136, respectively. The limit switch R is in circuit with the limit switch Q which is normally closed when the furnace is in alignment with the inlet flue, and is opened when the furnace moves to a predetermined position out of alignment with the flue. When both limit switches R and Q are closed, the turn-table B may be rotated to turn furnace A out of alignment with the inlet flue D by moving a manually controlled switch P against contact 139, thereby closing a relay actuating circuit (No. 7) as follows: Wires 105, 140, manually controlled switch P, contact 139, wire 141, contact 134, limit switch R, wire 142, limit switch Q, wire 143, relay magnet 144, wire 145, relay magnet 146, wire 147 and negative line wire 118.

This circuit energizes magnets 144 and 146, so as to move their armatures against contacts 150, 151, respectively, thereby closing a circuit (No. 8) through motor 34 as follows: Wires 105, 140, 152, series field 153 of motor 34, wire 154, contact 151, relay armature 149, wire 155, motor armature 156, wire 157, relay armature 148, contact 150 and wire 158 connected at 159 to the negative wire 147 of circuit No. 7. When the furnace A reaches a predetermined position out of alignment with the flue, the circuit No. 7 is broken at the limit switch Q, thereby deenergizing relay magnets 144 and 146, so as to permit their armatures 148 and 149 to move away from contacts 150 and 151, and thereby open the circuit through the motor 34. When the furnace A reaches such predetermined position out of alignment with the flue D, the limit switch S is moved automatically against its contact 161. The manually controlled switch P may now be moved against contact 162 to close a relay circuit (No. 9) as follows: Wires 105, 140, manually controlled switch P, contact 162, wire 163, limit switch S, contact 161, wire 164, relay magnet 165, wire 166, relay magnet 167 and wire 168, which connects at 169 with the negative wire 147 of circuit No. 7. This circuit energizes magnets 165 and 167, so as to move the relay armatures 170, 171 against contacts 172 and 173, to close a reversing circuit (No. 10) through the motor 34 as follows: The wiring of circuit No. 8 to the point indicated by reference numeral 174, thence through wire 175, relay armature 170, contact 172, wires 176, 157, motor armature 156, wire 155 to the point indicated at 177, thence through wire 178, relay armature 171, contact 173 and wire 179 to the point 180 at which it connects with wire 158 of circuit No. 9.

When the turn-table is moved to a position to bring the furnace A into alignment with the inlet flue D, the limit switch S is automatically opened, thereby opening the circuit through the relay magnets 165, 167, whereupon the armatures 170, 171 move away from their contacts 172, 173, so as to open the circuit through the motor 34. In this position of the turn-table the limit switches N and Q are again closed. The inlet flue structure may now be moved toward the furnace A. This is accomplished by first closing a circuit making device 107ᵇ which momentarily closes a circuit (No. 11)

through the wires of circuit No. 4 to binding post 182, thence through wire 183, contact 136, limit switch M, wire 184, relay magnet 185, wire 186, relay magnet 187, wires 188, 189, momentarily closed circuit making device 107ᵇ, wires 190, 117 and 118. This circuit energizes magnets 185, 187, so as to move their armatures against contacts 193, 194, respectively, thereby closing a circuit (No. 12) through the motor 75 as follows: Circuit No. 5 to point 195, thence through wire 196, contact 194, relay armature 192, wire 197 to wire 128, motor armature 127, wire 126 to relay armature 119, thence through wire 198, relay armature 191, contact 193, wires 199 and 129 to negative line wire 118. A holding circuit (No. 13) through relay magnets 185, 187 is closed, as soon as the armatures 191, 192 are moved against contacts 193, 194. This holding circuit follows the wiring of circuit No. 11 to binding post 200, at which point it connects with the negative side of the motor circuit No. 12. When the flue structure D reaches the desired position with relation to furnace A, the limit switch M is automatically opened, thereby deenergizing megnets 185, 187 so as to permit their armatures 191, 192, to to move away from their contacts 193, 194, to open the circuit No. 12 through the motor 75. At the time that the limit switch M is opened, the limit switch L is automatically closed and the limit switch R is automatically opened.

I claim:

1. In balling apparatus, the combination of inlet and discharge flues, a balling furnace between the same, means for giving angular movement to the furnace to bring it into and out of alignment with the flues, and means for moving the inlet flue toward and away from the balling furnace.

2. In balling apparatus, the combination of inlet and discharge flues, a balling furnace between the same, means for bringing the furnace into and out of alignment with the flues, means for moving the inlet flue toward and away from the balling furnace, and controlling mechanism whereby movement of the furnace from its operative position can be effected only after movement of the inlet flue away from the furnace and the movement of the flue toward the furnace can be effected only when the furnace is in its operative position.

3. In balling apparatus, the combination of inlet and discharge flues, a balling furnace supported so that it may be turned into and out of alignment with said flues, said inlet flue being supported so that it may move to and away from the furnace, electric motors for effecting said movements of the furnace and inlet flue, and a controlling mechanism for the motors whereby the movement of the furnace from its operative position can be effected only after movement of the flue away from the furnace and the movement of the flue toward the furnace can be effected only when the furnace is in its operative position.

4. In balling apparatus, the combination of a stationary discharge flue, an inlet flue, a carriage supporting the inlet flue, a track for the carriage in line with the outlet flue, a turn-table between the track and outlet flue a balling furnace on said turn table adapted to align with said flues, and means for moving said carriage on its track and for rotating said turn-table.

5. In balling apparatus, the combination of a stationary discharge flue, an inlet flue, a carriage supporting the inlet flue, a track for the carriage in line with the outlet flue, a turn-table between the track and outlet flue, a balling furnace on said turn-table adapted to align with said flues, means which may be actuated to first move the carriage away from the furnace and means thereafter made effective to rotate the turn-table to swing the furnace out of alignment with the flues, said means being operative for return of the parts to their operative positions only when actuated to first rotate the turn-table to align said flues and thereafter actuated to move the carriage toward said furnace.

6. In balling apparatus, the combination of a stationary discharge flue, an inlet flue, a carriage supporting the inlet flue, a track for the carriage in line with the outlet flue, a turn-table between the track and outlet flue, a balling furnace on said turn-table adapted to align with said flues, separate electric motors for moving said carriage on the track and rotating said turn table, and control mechanism for said motors whereby, when the turn table is rotated to swing the furnace out of alignment with the flues, the inlet flue is first moved away from the furnace and whereby, when said parts are returned to their operative position, the turn-table is first rotated to align the furnace with the flues and the inlet flue then moved toward the furnace.

7. In balling apparatus, the combination of a stationary discharge flue, an inlet flue, a carriage supporting the inlet flue, a track for the carriage in line with the outlet flue, a turn-table between the track and outlet flue, a balling furnace on said turn-table adapted to align with said flues, separate electric motors for moving said carriage on the track and rotating said turn-table, and control mechanism for said motors whereby, when the turn-table is rotated to swing the furnace out of alignment with the flues, the inlet flue is first moved away from the furnace and whereby, when said parts are returned to their operative position, the turn-table is first rotated to align the furnace with the flues and the inlet flue then moved toward the furnace, said controlling mechanism comprising means whereby the movements of said carriage and turn-table out of or into their operative positions may be stopped at intermediate points.

8. In balling apparatus, the combination of a stationary discharge flue, an inlet flue, a carriage supporting the inlet flue, a track for the carriage in line with the outlet flue, a turn-table between the track and outlet flue, a balling furnace on said turn-table adapted to align with said flues, separate electric motors for moving said carriage on the track and rotating said turn-table, and control mechanism for said motors whereby, when the turn-table is rotated to swing the furnace out of alignment with the flues, the inlet flue is first moved away from the furnace and whereby, when said parts are returned to their operative position, the turn-table is first rotated to align the furnace with the flues and the inlet flue then moved toward the furnace, said controlling mechanism comprising means whereby the movements of said carriage and turn-table out of or into their operative positions may be stopped at intermediate points, and the movement of these parts resumed in either direction.

9. In balling apparatus, the combination of inlet and discharge flues, a balling furnace supported so that it may be turned into and out of alignment with said flue, said inlet flue being supported so that it may move to and away from the furnace, electric motors for effecting said movements of the furnace and inlet flue, and a controlling mechanism for the motors whereby the movement of the furnace from its operative position may be effected after movement of the flue away from the furnace and the movement of the flue toward the furnace may be effected after the return of the furnace to its operative position, said control mechanism comprising means whereby the movements of said furnace and inlet flue out of and into their operative positions may be stopped at intermediate points and the movement of said parts thereafter resumed in either direction.

10. In balling apparatus the combination of a balling furnace and an inlet flue with which said furnace normally aligns, means for swinging the furnace angularly out of and into alignment with the flue, and means for moving the flue toward and away from the furnace.

11. In balling apparatus, the combination of an inlet flue supported so that it may be moved forwardly and backwardly, a balling furnace supported so that it may be moved into and out of alignment with said flue, electric motors for effecting said movements of the inlet flue and furnace, and control mechanism for said motors whereby the movement of the furnace from its operative position may be effected only after movement of the inlet flue away from the furnace and the movement of the flue toward the furnace may be effected only when the furnace is in alignment with the flue.

12. In a balling furnace, the combination of an inlet flue, a carriage on which the inlet flue is supported, a track for the carriage, a balling furnace, a turn-table on which said balling furnace is supported, and means for moving said carriage on said track and for rotating said turn-table.

13. In a balling furnace, the combination of an inlet flue, a carriage on which the inlet flue is supported, a track for the carriage, a balling furnace, a turn-table on which said balling furnace is supported, and means which may be actuated to first move the carriage away from the furnace and thereafter actuated to rotate the turn-table to swing the furnace out of alignment with the flue, and, for return of the parts to their operative positions, is actuated to first rotate the turn-table to align the furnace with the flue and thereafter actuated to move the carriage toward the furnace.

14. In balling apparatus, the combination of a rotary furnace comprising a substantially cylindrical pre-heating chamber and an enlarged annular balling chamber at one end of the furnace, and means for introducing finely divided fuel with air directly into the balling chamber.

15. In balling apparatus, the combination of a rotary furnace comprising a substantially cylindrical pre-heating chamber and an enlarged annular balling chamber at one end of the furnace, and a fuel oil and air nozzle arranged so as to inject oil mixed with air into said balling chamber.

16. In balling apparatus, the combination of a rotary furnace comprising a substantially cylindrical pre-heating chamber and an enlarged annular balling chamber at one end of the furnace, a fuel oil and air nozzle arranged so as to inject oil mixed with air into said balling chamber, and means for heating the air before it enters the balling chamber.

17. In balling apparatus, the combination of a rotary furnace comprising a substantially cylindrical preheating chamber and an enlarged annular balling chamber at one end of the furnace, and a pair of downwardly inclined nozzles for introducing a fluid fuel with air into the balling chamber, one of which nozzles is arranged at a higher level than the other, and on the side thereof toward the upward movement of the metal in the furnace produced by the rotation thereof.

18. In balling apparatus, the combination of a rotary balling furnace arranged so that it may be turned to and from its operative position, a carriage movable to and from the furnace, an inlet flue on the carriage with which said furnace is adapted to align, a fluid fuel nozzle projecting into said flue, and an air heating duct surrounding said flue and opening into the same.

19. In balling apparatus, the combination of a rotary balling furnace arranged so that it may be turned to and from its operative position, a carriage movable to and from the furnace, an inlet flue on the carriage with which said furnace is adapted to align, a fluid fuel nozzle projecting into said flue, and an air heating duct surrounding said flue and opening into the same, having an intake located adjacent the space between the flue and furnace.

20. In balling apparatus, the combination of a rotary balling furnace arranged so that it may be turned to and from its operative position, a carriage movable to and from the furnace, an inlet flue on the carriage with which said furnace is adapted to align, a fluid fuel nozzle projecting into said flue, an air heating duct surrounding said flue and opening into the same, and means for injecting steam into the air which passes through said duct.

21. In balling apparatus, the combination of a rotary balling furnace arranged so that it may be turned to and from its operative position, a carriage movable to and from the furnace, an inlet flue on the carriage with which said furnace is adapted to align, a fluid fuel nozzle projecting into said flue, an air heating duct surrounding said flue and opening into the same, and a fan for forcing the air from said duct into the flue.

22. In balling apparatus, the combination of a rotary balling furnace arranged so that it may be turned to and from its operative position, a carriage movable to and from the furnace, an inlet flue on said carriage with which the furnace is adapted to align, a nozzle arranged in said flue for injecting oil mixed with air into the balling chamber, and an oil supply conduit comprising two telescopic members one stationary and the other arranged on the carriage and connected with said nozzle.

23. The combination with a balling furnace, an inlet flue with which said furnace normally aligns, means comprising a reversible electric motor for moving the furnace out of and into alignment with the flue, and means comprising an electric motor for moving the flue away from and toward the furnace, of controlling mechanism for said first mentioned motor comprising a switch which is opened when the flue is moved to a predetermined position toward the furnace and is closed when said flue is moved to a predetermined position away from said furnace, whereby said first mentioned motor can be energized only when said flue is in its outer position; and controlling mechanism for said second mentioned motor comprising a switch which is closed when said furnace is in alignment with said flue and is opened when the furnace is out of alignment therewith, whereby said second mentioned motor can be energized only when the furnace is in alignment with the flue.

24. In balling apparatus, the combination of a rotary balling furnace, an inlet flue with which said furnace is adapted to align, a fluid fuel nozzle projecting into said flue, and an air heating duct surrounding said flue and opening into the same.

25. In balling apparatus, the combination of a rotary balling furnace, an inlet flue with which said furnace is adapted to align, a fluid fuel nozzle projecting into said flue, and an air heating duct surrounding said flue and opening into the same and having an intake opening arranged near the space between said rotary balling furnace and inlet flue.

26. In balling apparatus, the combination of a rotary balling furnace, an inlet flue with which said furnace is adapted to align, a fluid fuel nozzle projecting into said flue, an air heating duct surrounding said flue and opening into the same, and means for injecting moisture into the air passing through said duct.

27. In balling apparatus, the combination of a balling furnace and an inlet flue with which said furnace normally aligns, means for swinging the furnace angularly out of and into alignment with the flue, and means for moving the flue toward and away from the furnace which means is effective to move said flue into and out of its normal operative position only when the furnace is in substantially its normal operative position.

JOHN M. SELLERS.